(12) United States Patent
Tavares et al.

(10) Patent No.: US 11,310,118 B2
(45) Date of Patent: Apr. 19, 2022

(54) TRACKING RANDOMIZED ADDRESSES IN BLUETOOTH DEVICES

(71) Applicant: HEWLETT PACKARD ENTERPRISE DEVELOPMENT LP, Houston, TX (US)

(72) Inventors: Kairo Cesar Pinto Tavares, Porto Alegre (BR); Carlos Gomez Gallego, Brisbane (AU); Leandro Marcio Da Rosa, Porto Alegre (BR); Carlos Eduardo Cardoso Reif, Porto Alegre (BR)

(73) Assignee: Hewlett Packard Enterprise Development LP, Houston, TX (US)

( * ) Notice: Subject to any disclaimer, the term of this patent is extended or adjusted under 35 U.S.C. 154(b) by 330 days.

(21) Appl. No.: 16/252,984

(22) Filed: Jan. 21, 2019

(65) Prior Publication Data

US 2020/0236004 A1 Jul. 23, 2020

(51) Int. Cl.
*H04L 12/24* (2006.01)
*H04L 41/16* (2022.01)
*H04B 17/318* (2015.01)
*H04W 24/10* (2009.01)
*H04W 4/80* (2018.01)

(52) U.S. Cl.
CPC ........... *H04L 41/16* (2013.01); *H04B 17/318* (2015.01); *H04W 4/80* (2018.02); *H04W 24/10* (2013.01)

(58) Field of Classification Search
None
See application file for complete search history.

(56) References Cited

U.S. PATENT DOCUMENTS

| 8,971,807 | B2 | 3/2015 | Hillyard | |
|---|---|---|---|---|
| 9,107,069 | B2 | 8/2015 | Engelien-Lopes | |
| 9,853,969 | B2 * | 12/2017 | Enke | H04W 52/0209 |
| 10,862,350 | B2 * | 12/2020 | Keeley | H01F 38/14 |
| 2012/0257753 | A1 * | 10/2012 | Ochikubo | H04L 61/2038 380/270 |
| 2014/0057567 | A1 * | 2/2014 | Desai | H04W 8/005 455/41.2 |
| 2014/0155031 | A1 * | 6/2014 | Lee | H04W 12/08 455/411 |

(Continued)

OTHER PUBLICATIONS

Wang, P., Bluetooth Low Energy—Privacy Enhancement for Advertisement, (Research Paper), Jun. 2014, 93 Pgs.

*Primary Examiner* — Hassan A Phillips
*Assistant Examiner* — Gautam Sharma
(74) *Attorney, Agent, or Firm* — Nolte Lackenbach Siegel

(57) ABSTRACT

Systems and methods for method for resolving Bluetooth device identity regardless of changes in MAC (Media Access Control) addresses are disclosed. For example, a processing system is disclosed that can establish a set of recognized Bluetooth devices based on a first set of data, receive a second set of data measured during a second time period subsequent to the first time period, and in an instance in which a particular UIADD from the second set of data is not found in the first set of data, determine whether a candidate Bluetooth device that transmitted the particular UIADD is a specific recognized Bluetooth device of the set of recognized Bluetooth devices established based on the first set of data.

20 Claims, 12 Drawing Sheets

(56) References Cited

U.S. PATENT DOCUMENTS

| | | | |
|---|---|---|---|
| 2015/0289295 A1* | 10/2015 | Granbery | H04L 67/1046 |
| | | | 370/230 |
| 2016/0227351 A1* | 8/2016 | Gu | H04W 48/10 |
| 2017/0111346 A1* | 4/2017 | Tung | H04L 63/0853 |
| 2017/0238328 A1* | 8/2017 | Luong | H04L 43/16 |
| | | | 370/329 |
| 2018/0098368 A1* | 4/2018 | Wu | H04W 76/14 |
| 2018/0198752 A1* | 7/2018 | Zhang | H04W 12/02 |
| 2018/0324152 A1* | 11/2018 | Jarchafjian | H04W 4/023 |
| 2019/0020641 A1* | 1/2019 | Wasily | H04L 9/3213 |
| 2019/0342743 A1* | 11/2019 | Marchand | H04W 76/19 |
| 2020/0228862 A1* | 7/2020 | Chung | H04L 61/6022 |

\* cited by examiner

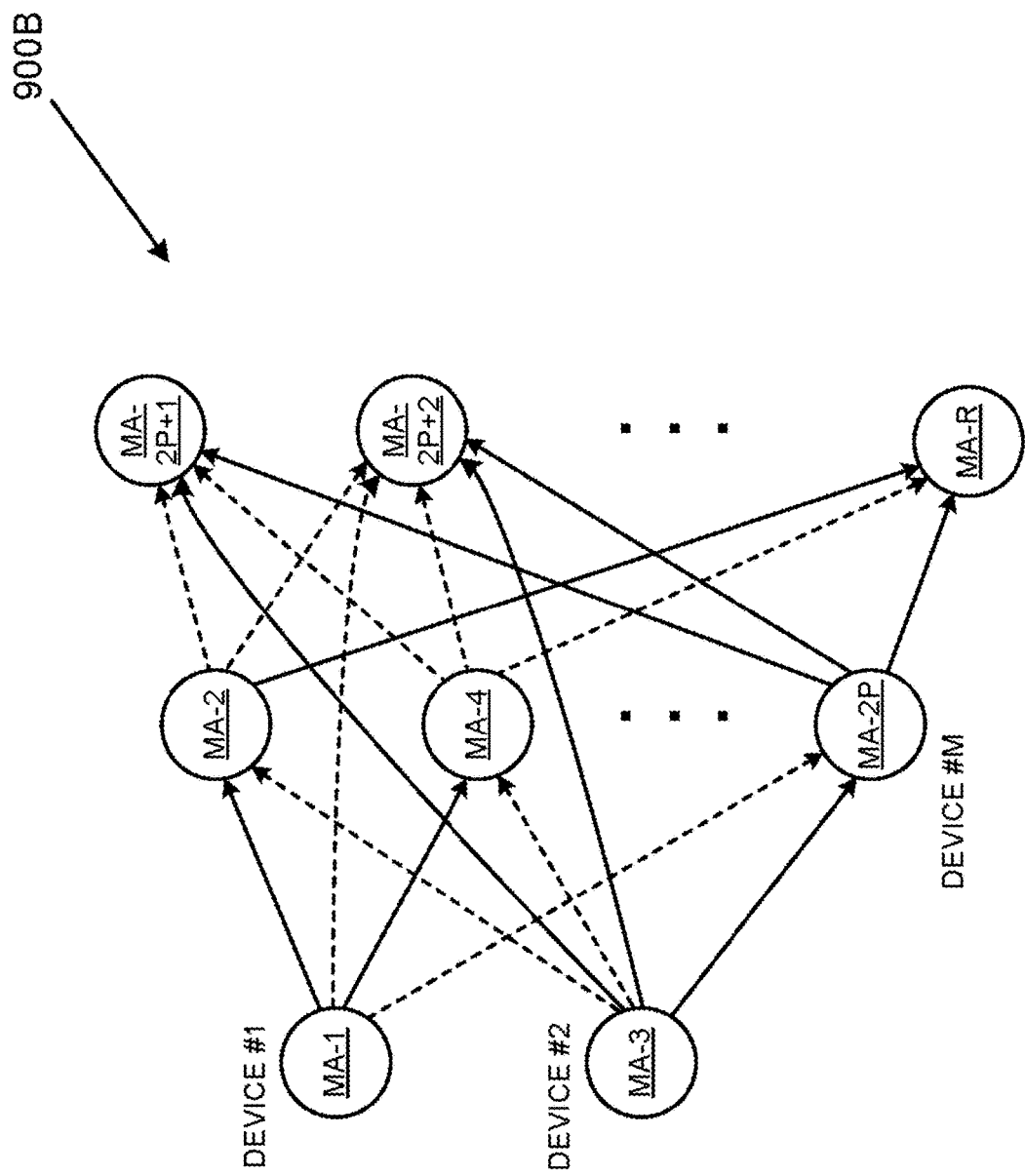

TRACKING RANDOMIZED ADDRESSES IN BLUETOOTH DEVICES

BACKGROUND

Networked devices employ what is known as "Media Access Control" (MAC) addresses or other addressing schema to provide a unique identity to each networked device such that the various networked devices can provide targeted communications and distinguish one device from another. However, in order to provide a level of privacy to users, certain communication standards employ "address randomization," which causes individual devices to periodically change their respective MAC or other address identifiers.

BRIEF DESCRIPTION OF THE DRAWINGS

Various examples of this disclosure that are proposed as examples will be described in detail with reference to the following figures, wherein like numerals reference like elements, and wherein:

FIGS. 9A-9D depict an example Candidate Graph (CG) usable for resolving the identities of various Bluetooth devices while such devices change their respective UIADDs.

DETAILED DESCRIPTION

Figure 1:
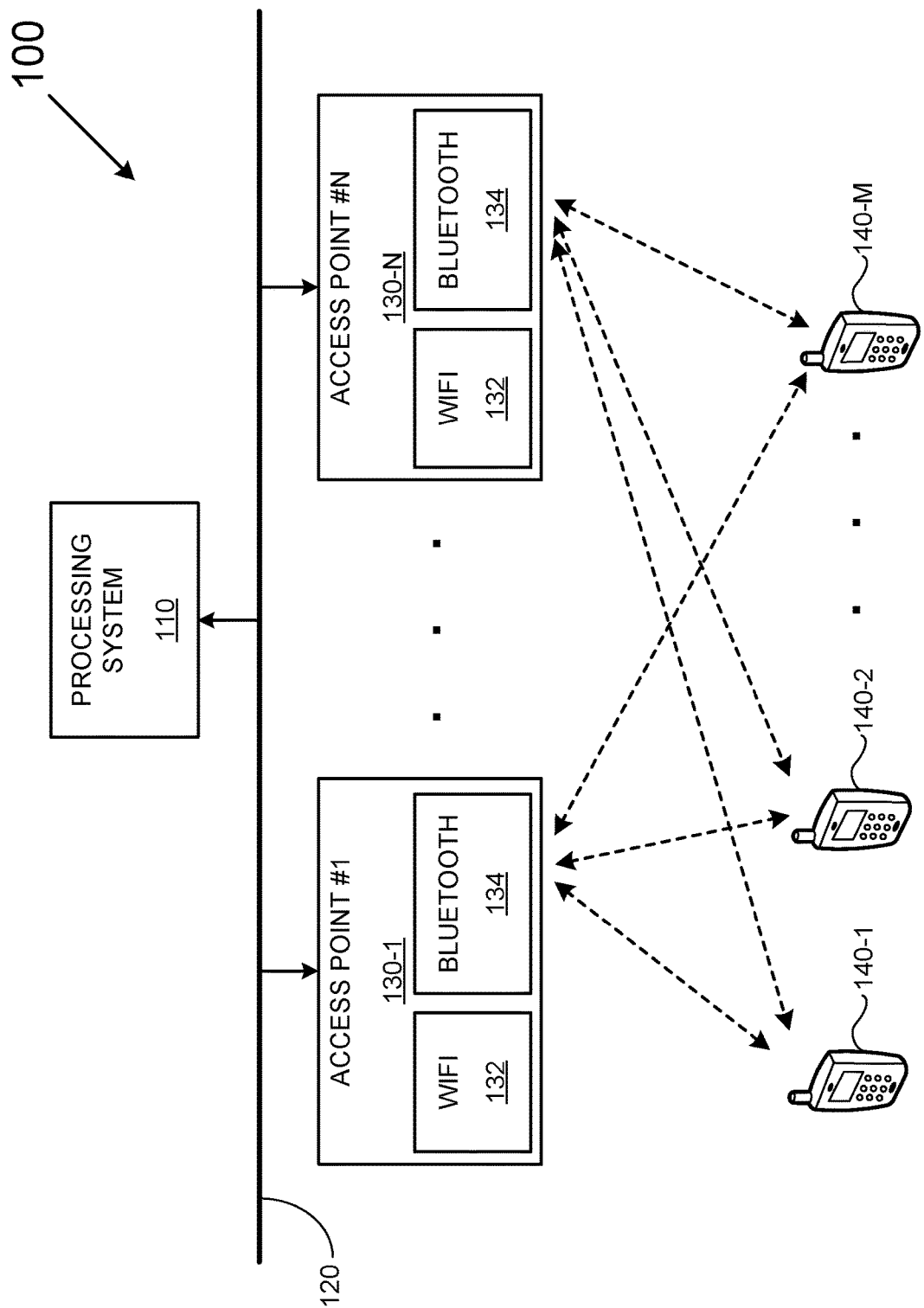
FIG. 1 is a block diagram of an example tracking system capable of sensing, storing, and analyzing wireless transmissions from Bluetooth devices.

The methods and systems disclosed below may be described generally, as well as described in terms of specific examples. For instances where references are made to detailed examples, it is noted that any of the underlying principles described are not to be limited to a single example but may be expanded for use with any of the other methods and systems described herein as will be understood by one of ordinary skill in the art unless otherwise specifically stated.

As is stated above, networked communications devices employ what is known as a MAC address or similar identifier to provide a unique identity for each networked device. For the purposes of this disclosure, the term "Unique Identity ADDress" (UIADD) is used for such identification information that a MAC address and similar schema perform.

Generally, Bluetooth devices periodically broadcast their respective UIADDs in order to advertise their existence to the world.

However, such broadcasts lead to privacy concerns. Accordingly, in order to provide a greater level of user privacy, a number of communication standards, such as Bluetooth Low Energy ("Bluetooth LE" or "BLE"), employ "address randomization" whereby a BLE device's UIADD periodically changes so as to prevent casual tracking. While various communication standards do not always address how often UIADDs change, empirical evidence shows that many privacy-concerned BLE devices change UIADDs at a rate of about once every minute, where less privacy concerned devices change UIADDs hourly or only between reboots.

Nevertheless, while successful tracking may infer that the privacy that should be achieved by the address randomization has flaws and should be flagged as a security risk to a user, the ability of a given wireless environment to correctly track the continued presence of individual BLE devices while not compromising a user's data is useful. Such tracking enables vendors to provide important information and better manage infrastructure. For example, it can be useful to track the number of different Bluetooth devices in a given area to generate presence analytics, estimate crowd size, estimate crowd dynamics, provide indoor navigation, and provide retail marketing campaigns. Thus, the disclosed methods and systems propose a solution to circumvent BLE address randomization while maintaining the privacy concerns of consumers.

For the purposes of this disclosure, the following definitions apply.

The term "set" refers to a collection of one or more objects, and for the purposes of this disclosure a particular set of objects may be dynamically re-defined/re-established to include different objects and a different number of objects.

The term "heuristic rule," unless otherwise stated, means some rule or method that provides some "rule of thumb" solution to a problem, often when limited data is available. Heuristic rules are frequently useful to aide in the process of elimination. For example, as discussed below, if two separate wireless transmissions contain data that indicate such transmissions originated from devices made by different companies, then the possibility that the two transmissions originated from a single device may be eliminated.

The term "access point" has a known meaning in the relevant arts as a wireless Local Area Network (LAN) device that optionally includes a Bluetooth transponder. However, for the purposes of this disclosure, a Bluetooth "access point" is any device capable of sensing Bluetooth transmissions and reporting information derived from such transmissions to some form of processing system. For example, any number of Bluetooth-enabled printers, point-of-sale terminals, or other items with an appropriate network connection may be used as access points. Similarly, Bluetooth-enabled cell phones (with or without GPS) running an appropriate application and having an appropriate network permission may be used as access points.

The term "advertisement event" (AE), or "advertisement," refers to an occurrence where a Bluetooth device makes its presence known by wirelessly transmitting an "advertisement packet." Assuming that a Bluetooth device is configured to be in an advertisement mode, AEs occur periodically on each of multiple Bluetooth advertisement channels. While the time interval between AEs can be programmed to encompass a wide range of fixed intervals, each AE is also offset by a small random delay designed to reduce the possibility of collisions with AEs of different Bluetooth devices.

An "advertisement packet" refers to a bundle of data transmitted during an AE that typically includes the UIADD of the Bluetooth device that transmitted the AE as well as a payload of data. The payload typically contains a variety of data, some of which is discussed below. For instance, advertising packets may contain data that describes fixed, immutable aspects about a Bluetooth device, such as a manufacturer identification of the device, a device model code, and an identification of the particular Bluetooth standard version/revision used by the device. Various Bluetooth devices broadcast packets for discovery purpose and beaconing. As is discussed below, advertisement packets/payloads use information blocks that represent different types of information as is detailed in various Bluetooth specifications. For instance, an information block can contain a complete local name, transmit power, and manufacture specific data.

A "recognized" Bluetooth device refers to a Bluetooth device that has been previously recognized and cataloged by some form of Bluetooth monitoring system.

A "new" Bluetooth device is Bluetooth device that, in a latest round of analysis by a Bluetooth monitoring system, is newly recognized by the Bluetooth monitoring system as a unique device that was not previously cataloged.

A "candidate" Bluetooth device is Bluetooth device that, during a latest and ongoing round of analysis by a Bluetooth monitoring system, is presently under consideration (i.e., a "candidate") by the Bluetooth monitoring system for categorization as one of a recognized Bluetooth device or a new Bluetooth device.

The term "fixed data" refers to any intrinsic quality of a Bluetooth device that is highly unlikely to change in the course of a given day and that can be determined based upon the content of an advertisement packet transmitted by a Bluetooth device. For example, the manufacturer and model number of a particular Bluetooth device, which is typically broadcasted in an AE, is expected to never change. While it is possible for software/firmware to be updated and the software/firmware revisions to be reflected in a particular device's advertisement packet, given the infrequency of such, updates and the tendency for such updates to occur offline, such aspects can be considered "fixed" for the purposes of this disclosure.

Other forms of fixed data may include, for example, a Universal Unique Identifier (UUID), such as iBeacon, eddystone, altheacon, any of available Generic Attribute Profile (GATT) services, and so on.

The term "persistent data" refers to any intrinsic quality of a Bluetooth device that is not immutable but is expected to change at most minutely, i.e., less than one percent between two consecutive AEs spaced ten seconds apart. For example, the battery storage level of a particular Bluetooth device is expected to change within a threshold percent over the course of a predetermined period of time, e.g., one minute. In one example, if it is observed that the respective battery level associated with two separate UIADDs differs by 25% for two AEs transmitted less than a minute apart, then it is highly unlikely that the two separate UIADDs were transmitted by a single Bluetooth device. As another example, if it is observed that the respective battery levels associated with two separate UIADDs differs by 0.5% (or less) for two AEs transmitted a minute apart, then there may be an appreciable possibility that the two separate UIADDs were transmitted by the same Bluetooth device. However, it is to be appreciated that the "predetermined time period" is not limited to being less than a minute and may vary widely as may be appreciated to those of ordinary skill taking into consideration known and expected battery performances. Also, for the purposes of this disclosure, a battery voltage level may be considered an equivalent to a battery's energy storage level given the relationship between a battery's voltage and an amount of energy stored in the battery.

Other persistent data may include, for example, any form of sensor data (temperature, etc.) that is expected to change at most minutely between advertisement events.

The term "behavioral data" refers to some expected or measured/measurable behavioral pattern of a Bluetooth device. One example of behavioral data may include the particular times and/or frequency that a given Bluetooth device changes its UIADD. For instance, if a particular recognized Bluetooth device is observed as changing a UIADD every time $t=t_1+t_{Tau}$, where $t_1$ is a specific instance in time and $t_{Tau}$ is a specific time period, then any new UIADD that appears in an AE that conforms with time $t=t_1+t_{Tau}$ (plus or minus some measurement error, and taking into account embedded random delays) is more likely to have been transmitted from the particular recognized Bluetooth device as compared to if the AE didn't conform with $t=t_1+t_{Tau}$. Other forms of behavioral data may include, for example, a frequency that a particular Bluetooth device broadcasts an AE, a frequency that a particular Bluetooth device makes other broadcasts/transmissions or any other possible behavior that might be expected or observed.

Figure 6:
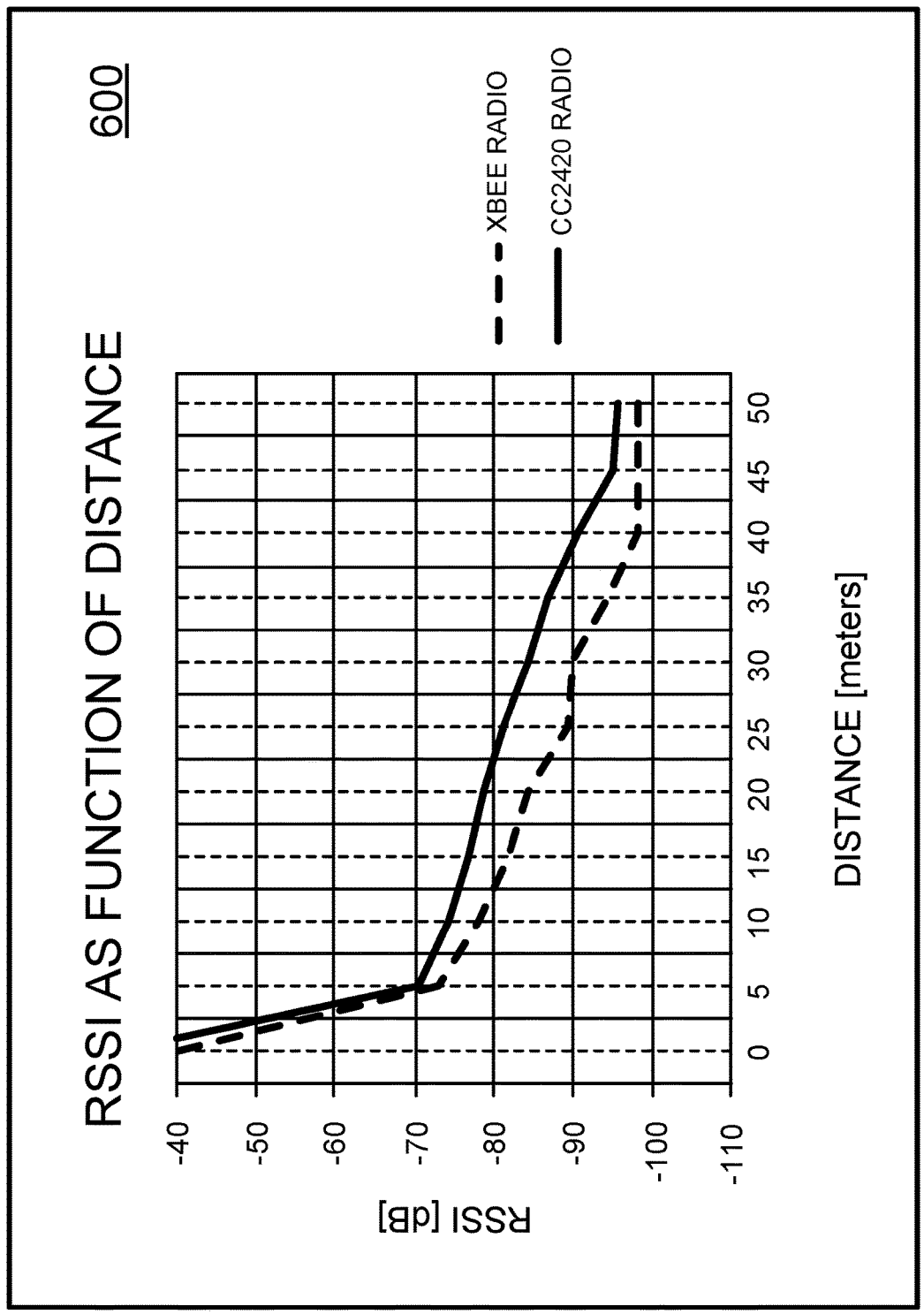
FIG. 6 is a graph depicting an expected distance between two Bluetooth devices based on a Received Signal Strength Indicator (RSSI).

The term "measured data" refers to some environmental or other physical property measured/measurable by a Bluetooth access point. For example, a Bluetooth access point can typically measure the signal strength of a signal transmitted by individual Bluetooth devices as well as (at least in theory) measure noise and interference. Typically, a measured signal strength is made available as a Received Signal Strength Indicator (RSSI), and such indicators may be used to determine a relative distance between a given Bluetooth device and Bluetooth access point. In order to better understand the relationship between RSSI and distance, FIG. 6 is provided in order to present a graph 600 of the expected distance between two Bluetooth devices based on an RSSI for two variants of Bluetooth radio standards. As shown in FIG. 6, for short distances (less than five meters), both the XBEE™ and CC2420 radio standards produce nearly identical results. However, beyond five meters the expected distance between Bluetooth devices varies greatly for a given RSSI. By way of example, at an −80 dB RSSI, the expected distance for an XBEE device is about 12.5 meters while the expected distance for a CC2420 device is expected to be about 22.5 meters. Accordingly, it is useful to take into consideration the particular radio standard when determining distance between devices.

Further, other types of measured/location data may include Unique Location Identifiers/Site Identification Identifiers that are a function of an absolute location of a Bluetooth device.

While not shown in FIG. 6, in addition to considering individual radio standards, it may be useful to take into consideration a device's manufacturer and hardware revision when determining distances between devices given that different manufacturers may be expected to make different design choices when implementing the same radio standard. Further, if a transmit power level of a Bluetooth device is available in an advertisement packet, such information may also be useful in determining distance.

Figure 7:
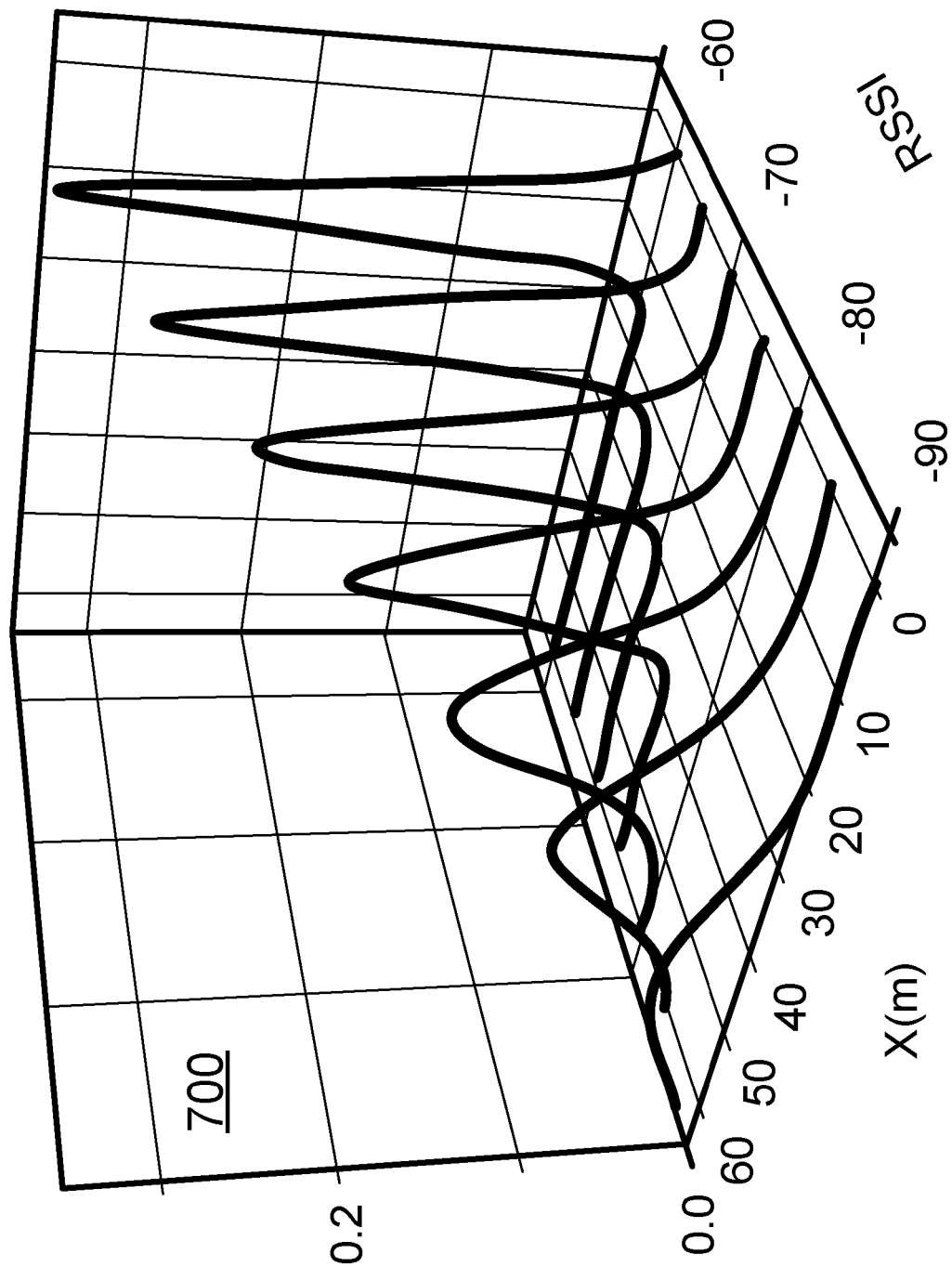
FIG. 7 is a graph depicting a family of probability distribution functions of distance between two Bluetooth devices versus measured RSSI levels.

While FIG. 6 provides expected distances for various RSSI levels, it can be useful to apply a probability distribution function of distance versus RSSI when RSSI is used as part of some stochastic/probability math model. Thus, FIG. 7 provides a graph 700 depicting a family of probability distribution functions of distance versus RSSI levels. As shown in FIG. 7, it is to be appreciated that an RSSI may provide information about the likelihood of the distance between two Bluetooth devices as a function of distance. Thus, making decisions about whether a particular new UIADD belongs to a known device can be calculated based on a set of probability-based equations, rather than solely determined based on heuristic rules.

As an extension of measuring relative distances between devices using RSSI, when multiple Bluetooth access points are used to monitor Bluetooth devices for a given area of interest, the general location of a Bluetooth device relative to the various Bluetooth access points may be determined. For instance, if a shopping mall contains one hundred Bluetooth access points and a particular Bluetooth access point measures the strongest reception for a given Bluetooth device, it may be determined that such device is nearest the particular Bluetooth access point. Accordingly, if two different UIADDs are transmitted within a typical Bluetooth AE timeframe (e.g., ten seconds) and the AEs occurred at locations several hundred meters apart, then the likelihood that the two UIADDs originated from a single Bluetooth device is low.

The term "pattern data" refers to any discernable pattern that may be found in any data packet transmitted by a Bluetooth device. That is, while a user's data is expected to be encrypted and thus generally safe from hacking, it has been determined through experimentation that the encrypted data from a particular Bluetooth device will often display some pattern that may provide at least a weak correlation from previously-transmitted packets. While perfectly encrypted data should have a random distribution and no discernable pattern at all, the structure of a payload of encrypted data may have a discernable pattern. For instance, manufacture specific data with N known variation of payloads may exhibit a pattern that may be detected. Accordingly, even encrypted packet data may be used to distinguish one given Bluetooth device from other Bluetooth devices.

FIG. 1 is a block diagram of an example Bluetooth tracking system 100 capable of providing a variety of services including presence monitoring of individual Bluetooth devices regardless of whether such devices change their respective UIADDs. As shown in FIG. 1, the Bluetooth tracking system 100 includes a processing system 110 and a number of access points {130-1, . . . 130-N} communicatively coupled together using network 120. Each of the access points {130-1, . . . 130-N} includes a WiFi (e.g., compliant with IEEE 802.11 standards) transponder 132 and a Bluetooth transponder 134 with the Bluetooth transponder 134 capable of passively monitoring any number of Bluetooth-capable devices, such as the wireless devices {140-1, . . . 140-M} shown at the bottom of FIG. 1.

In operation, each of the access points {130-1, . . . 130-N} passively monitors Bluetooth transmissions from any Bluetooth-enabled device within receiving range, and reports the data embedded within such transmissions to the processing system 110 via network 120. By way of example, for every AE sensed by a particular access point, the particular access point can report the content of the advertisement packet transmitted during the AE, the time the AE occurred, and some form of measured signal quality indicator of the AE, such as an RSSI, derived at the particular access point.

In addition to "passively" monitored data, some form of actively acquired data may be considered whether it is interactively acquired or passively monitored. For example, a scan response request could be considered an active interaction with a Bluetooth device by others, but the response may be passively monitored.

Still further, it is to be appreciated that when various devices are in communication with one another, such devices can exchange application data. Such exchange of data is typically organized hierarchically in sections called "services," which group conceptually related pieces called "characteristics." Services may include configuration properties and measurements (battery level, temperature scale, heart rate, etc.). Other data that can be leveraged include the low-level HCI sockets API to connect and capture information from a BLE device. Still other data that may be made available from a Bluetooth device include (as discussed above) Bluetooth versions, subversions and manufacturers, Bluetooth connection capabilities, pairing capabilities and input/output capabilities (keyboard only, display only, keyboard and display, etc.).

In turn, the processing system 110 can receive the monitored data, and use the monitored data to track the continuity of individual Bluetooth-enabled devices regardless of whether or not individual Bluetooth-enabled devices change their UIADDs. Thus, according to the disclosed methods and systems, an appropriately-configured processing system can build and maintain a monotonically increasing "Advertisement Event Timeline" (AET), which can be used to track random UIADD changes for previously recognized Bluetooth devices as well as identify newly-observed Bluetooth devices.

Figure 8:
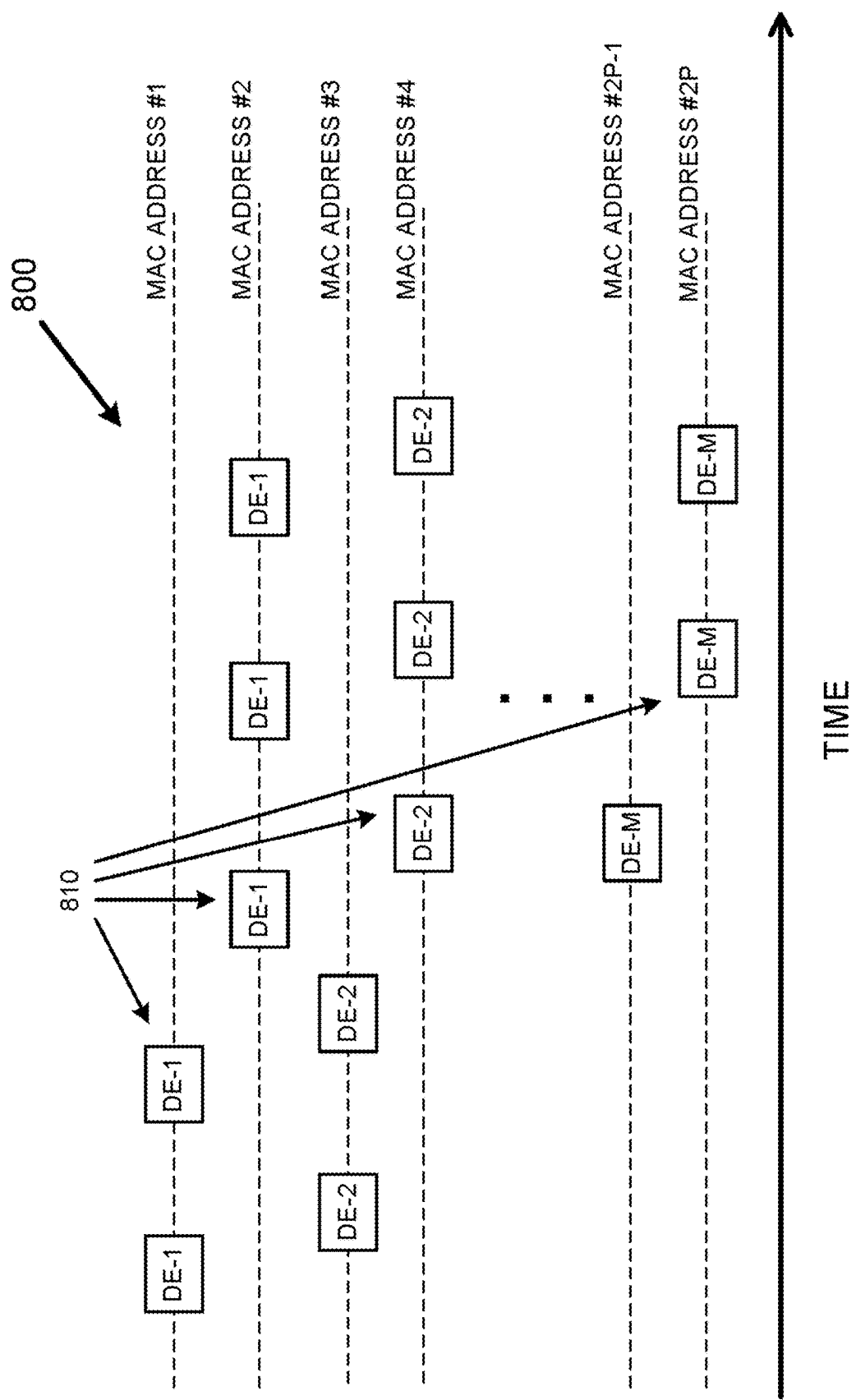
FIG. 8 is an example Advertisement Event Timeline (AET) depicting a number of Bluetooth devices periodically changing their respective UIADDs.

FIG. 8 is an example AET 800 depicting a number of Bluetooth devices {DE-1, . . . DE-M} periodically changing their respective UIADDs. As is shown in FIG. 8, Device #1 (DE-1) through Device #M (DE-M) will each periodically broadcast an AE 810. While not shown in FIG. 8, each AE 810 will contain a randomized UIADD as well as a number of other forms of information associated with the device that transmitted the AE 810. For example, as discussed above, various Bluetooth devices are known to broadcast the device's manufacturer identification and model number.

Figure 9A:
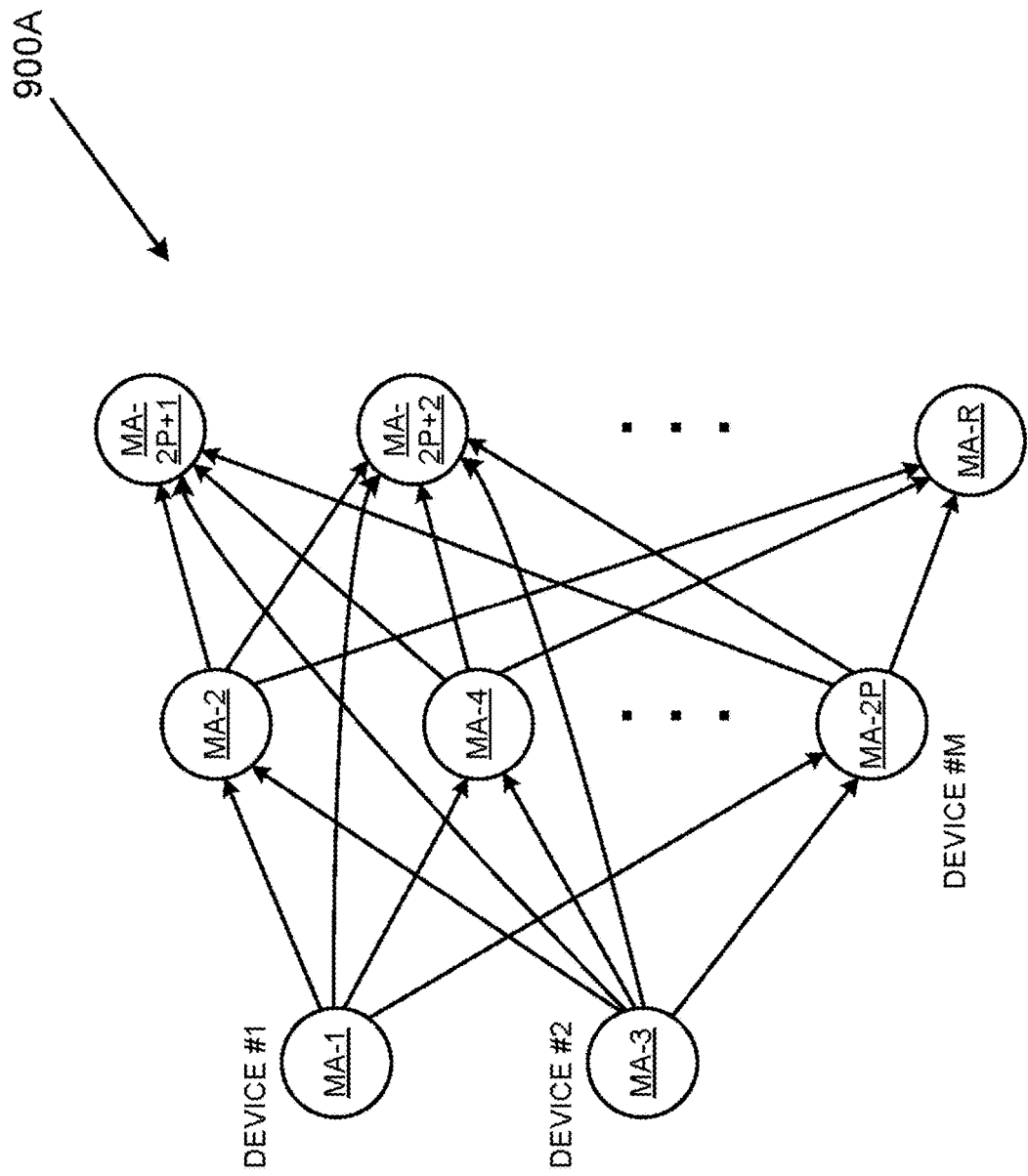

As shown in FIG. 9A, the passively-captured UIADDs and associated information, which is discussed in greater detail below, can be used to build a "Candidates Graph" (CG) 900A. The CG 900A depicts an assigned node for each random UIADD {MA-1, . . . MA-R} that has been transmitted and measured, and uses lines connecting the nodes to represent possible associations between different UIADDs.

Figure 9C:
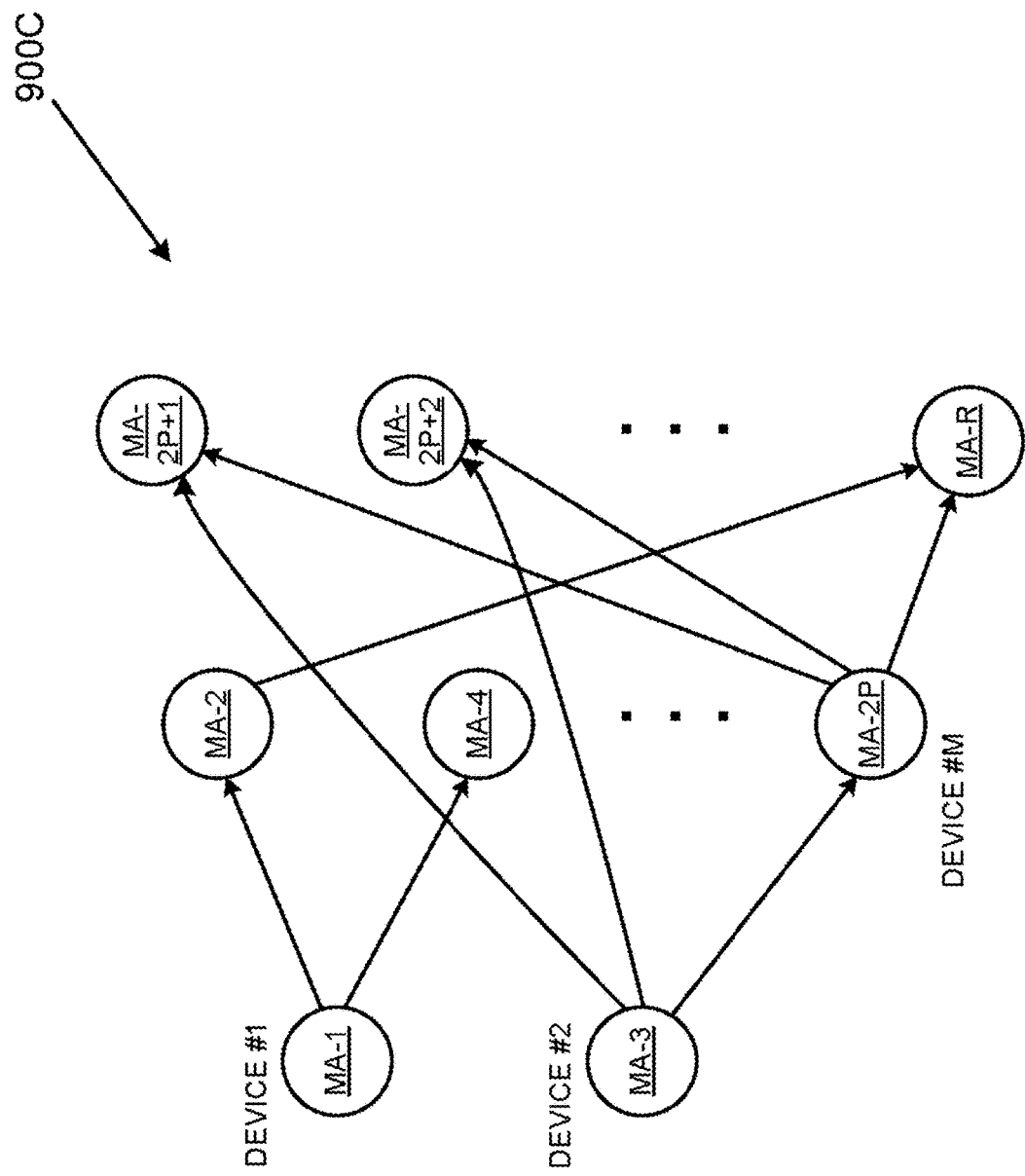

Continuing to FIGS. 9B-9C, the lines between UIADD nodes can be heuristically pruned using, for example, fixed, persistent and (sometimes) measured data to eliminate unlikely associations between different UIADDs. FIG. 9B depicts a modified CG 900B (as compared to CG 900A) where certain lines/connections are shown as dashed-discontinuous for all UIADDs that are impossibly or very unlikely to be associated with one another. For example, all lines connecting UIADD nodes that represent devices having a different manufacturer identification and/or model identification are made dashed-discontinuous, and in FIG. 9C the dashed-discontinuous lines of modified CG 900C are removed. While the pruning depicted in FIGS. 9B-9C is accomplished using a number of heuristic rules, in other examples heuristic pruning may be eliminated in favor of a set of stochastic/probability equations and/or a combination of heuristic rules and stochastic/probability equations. By way of example, some form of linear max-sum algorithm or max-product algorithm may be used to find a most likely assignment of candidate Bluetooth devices based on probabilities (even zero probabilities) assigned to particular weighted or unweighted parameters developed using the available fixed, persistent, and behavioral data.

Figure 9D:
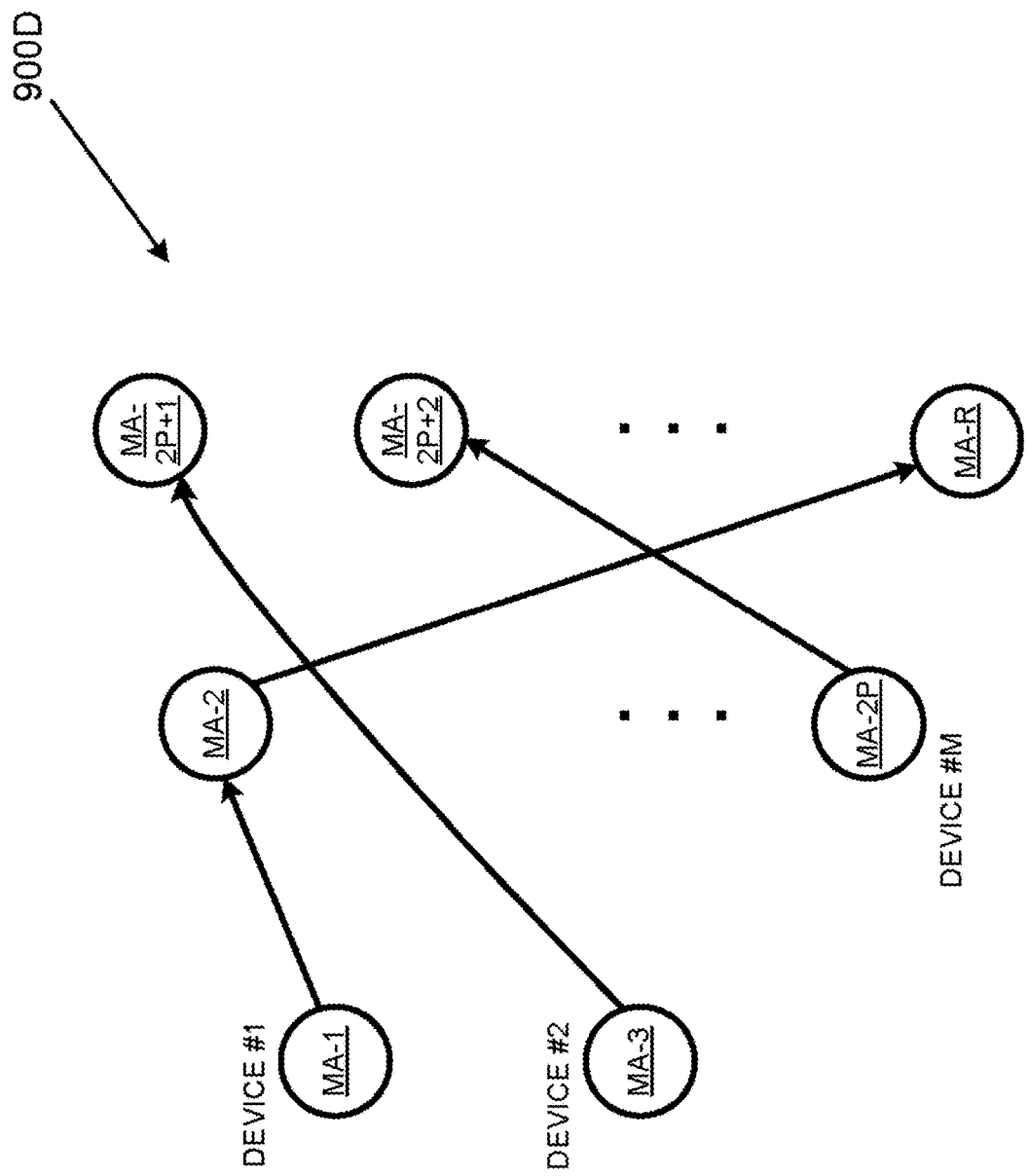

Continuing to FIG. 9D, "weak" correlative data, e.g., RSSI and certain pattern data, can be used to make final determinations as to what UIADDs are likely associated with the same device. By way of the example of FIG. 9D, using such weak correlative data, Device #1 is associated with UIADDs {MA-1, MA-2, MA-R} and Device #2 is associated with UIADDs {MA-3, MA-2P+1}. Similarly, Device #M is initially determined as a new Bluetooth device with respect to previously-recognized Bluetooth device #1 and device #2 and is associated with UIADDs {MA-2P, MA-2P+2}. While not depicted in FIGS. 9A-9D, in addition to a candidate device being designated as "recognized" or "new," there is a possibility that a previously recognized Bluetooth device may be cataloged as departed from the area under observation.

Figure 2:
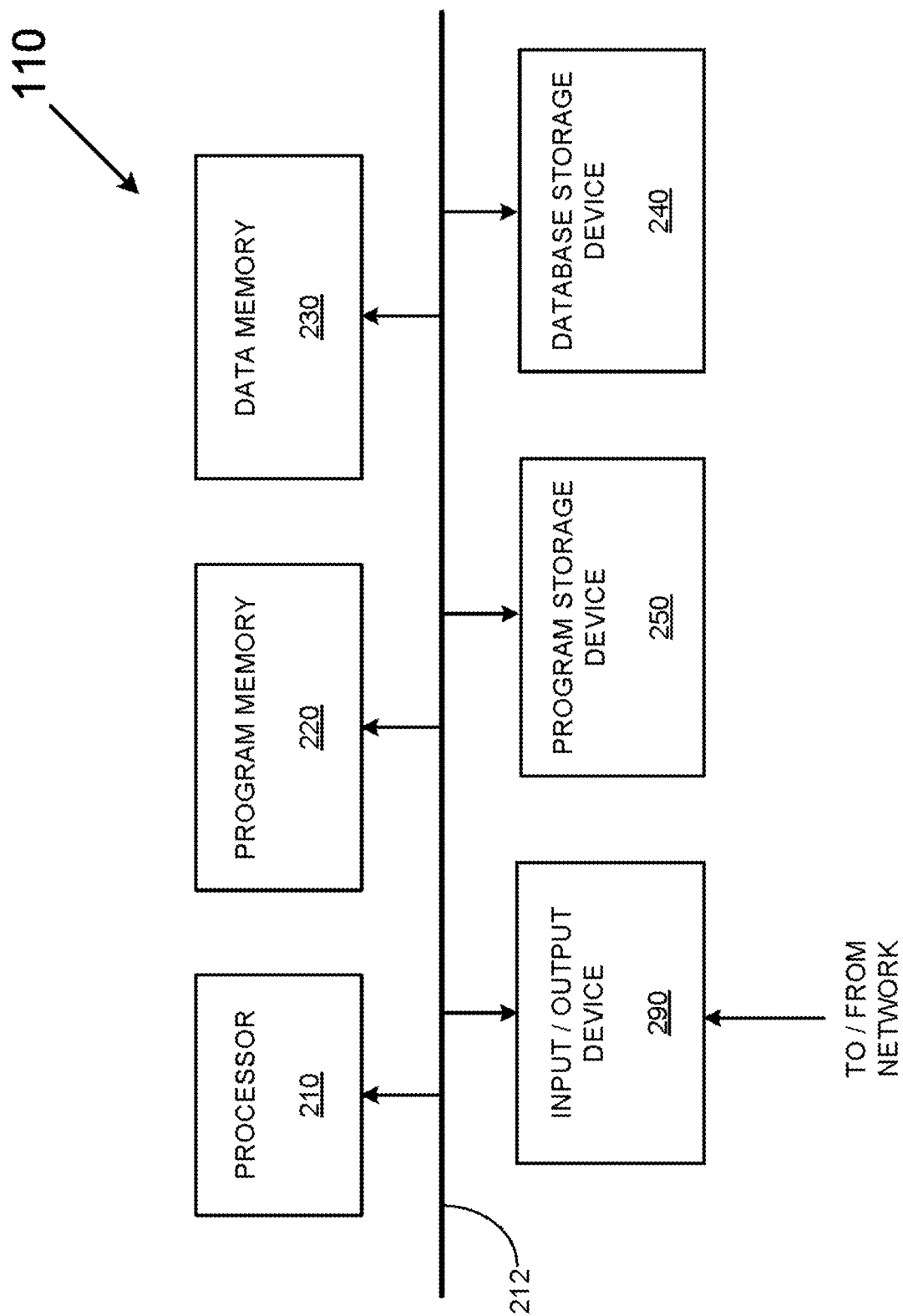
FIG. 2 is a block diagram of the example processing system of FIG. 1.

FIG. 2 depicts a block diagram of an example of a processing system 110 capable of tracking the continuity of Bluetooth devices regardless of whether the Bluetooth devices change their respective UIADD. As shown in FIG. 2, the example processing system 110 includes a processor 210 (e.g., a Central Processing Unit (CPU)), a program memory 220, a data memory 230, a database storage device 240, a program storage device 250, and an input/output device 290. The above components 210-290 are communicatively coupled together by a control/data bus 212.

Although the example processing system 110 of FIG. 2 uses a bussed architecture, it should be appreciated that any other architecture may be used as is well. For example, in various examples, the various components 210-290 can take the form of separate electronic components coupled together via a series of separate busses.

Still further, in other examples, one or more of the various components 210-290 can take form of separate servers coupled together via one or more networks. Additionally, it should be appreciated that each of components 210-290 advantageously can be realized using multiple computing devices employed in a cooperative fashion. For example, by employing two or more separate computing devices, e.g., servers, to provide separate processing and data-handling needs, processing bottlenecks can be reduced/eliminated and the overall computing time to produce histograms and other services can be significantly reduced.

It also should be appreciated that some processing, typically implemented in software/firmware routines residing in program memory 220, alternatively may be implemented using dedicated processing logic. Still further, some processing may be performed by software/firmware routines residing in separate memories in separate servers/computers being executed by different controllers.

In operation, the processing system 110 can first perform a number of setup operations including transferring an operating system and a number of appropriate program(s) from the program storage device 250 to the program memory 220. Thereafter, the processor 210 can perform any number of processes based on user commands entered via the input/output device 290, which provides an interface with external networks as well as with user peripherals, such as displays and keyboards.

During operation, the processing system 110 can communicate with external Bluetooth access points so as to configure the Bluetooth access points to passively monitor Bluetooth devices located within the vicinity of the individual Bluetooth access points. Subsequent operations are discussed with respect to FIGS. 3-5.

Figure 3:
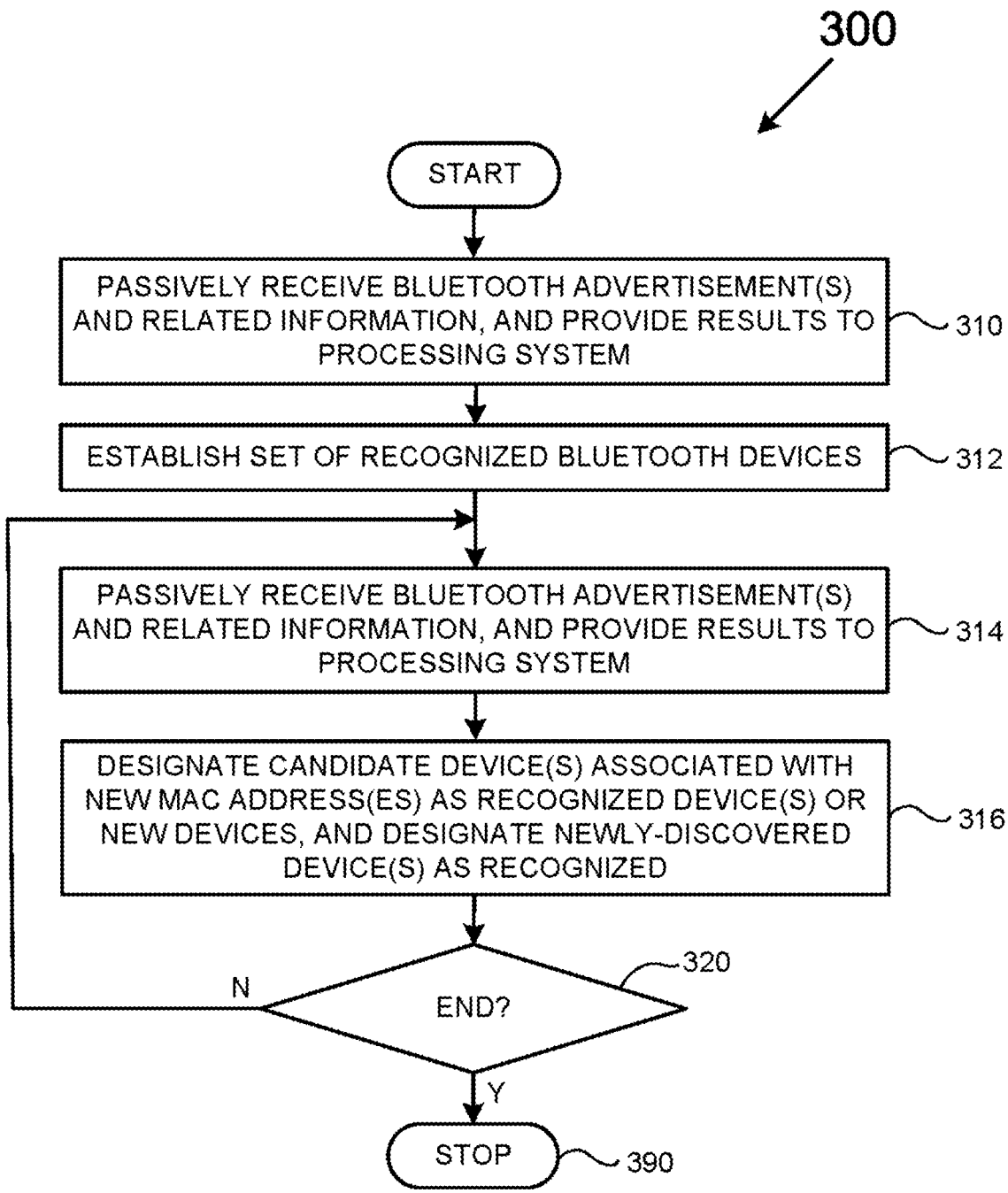
FIG. 3 is a flowchart of a method usable to resolve the identities of various Bluetooth devices in real time while such devices change their respective Unique Identifier ADDresses (UIADDs).

Turning to FIG. 3, a flowchart is provided that depicts a real-time method 300 usable to collect Bluetooth data and resolve the identities of various Bluetooth devices while such devices change their respective UIADDs. It is to be appreciated to those skilled in the art in light of this disclosure that, while the various operations of FIG. 3 are shown according to a particular order for ease of explanation, that certain operations may be performed in different orders or performed in a parallel fashion.

The process starts in operation 310 where a number of Bluetooth access points passively receive Bluetooth advertisement packets for AEs transmitted by various Bluetooth devices. The Bluetooth access point(s) provide data associated with the Bluetooth advertisement packets to some form of device, such as the processing system 110 of FIG. 2 (e.g., a device that includes a processor and a memory communicatively coupled to the processor), and in turn the processing device receives this first set of passively-collected data. This first set of passively-collected data includes a UIADD and at least one other item of related information for each of one or more Bluetooth devices located in an area containing one or more Bluetooth access points during a first time period. Such related information may include any or a combination of fixed data, persistent data, behavioral data, measured data, and pattern data discussed above. For example, the fixed data may include a manufacturer identification or a model identification; the persistent data may include a battery storage level; the behavioral data may include a time that a Bluetooth device transmits an AE and/or a time that the particular UIADD first appears; the measured data may include a received signal strength indicator or general location information; and the pattern data may include, for example, any pattern of data found in an advertisement packet.

For the purposes of this disclosure, the first time period may vary widely and can extend from the timespan of a single AE to whatever timespan may be found convenient or desirable. Further, the first time period may be an amalgam of multiple different time periods that have been independently observed.

In operation 312, based upon the UIADD(s) and related information gathered in 310, a set of "recognized Bluetooth devices" may be established/designated. As is discussed below, it may be expected that this set of recognized Bluetooth devices can be continuously updated/established based on subsequent data provided by the available Bluetooth access points.

In operation 314, as with operation 310 the above-mentioned Bluetooth access points passively receive Bluetooth advertisement packets, which are then provided to the processing system. In turn, the processing system receives this second set of data, which includes a UIADD and at least one other item of related information for each of the one or more Bluetooth devices in the area containing the one or more Bluetooth access points. This second set of data is measured by the one or more Bluetooth access points during a second time period subsequent to the first time period. As with the first time period, the second time period can vary widely and can encompass a period as small as the time span used to observe a single AE. Also, as with the first time period, the data collected during the second time period may include any of the data types and specific data discussed above.

In operation 316, in a condition where at least one particular UIADD from the second set of data is not found in the first set of data (i.e., the particular UIADD is not a previously observed UIADD), such newly discovered UIADD(s) is/are analyzed to determine whether such newly discovered UIADD(s) was/were likely transmitted by a recognized Bluetooth device or transmitted by a new Bluetooth device.

As is mentioned above, during this time of consideration, each Bluetooth device associated with a newly-observe UIADD is referred to as a "candidate" Bluetooth device. Based on the first set of data and at least one other item of related information associated with the candidate Bluetooth device that transmitted the new UIADD, it can be determined whether the candidate Bluetooth device is a specific recognized Bluetooth device of the set of recognized Bluetooth devices determined in operation 312 or a new Bluetooth device. As is discussed above, the process of determining whether a candidate Bluetooth device or a known device may be accomplished by any combination of heuristic rules and stochastic/probability equations.

Any newly-observed Bluetooth devices then may be designated as within the set of recognized Bluetooth devices.

In operation 320, a determination is made as to whether the method 300 of FIG. 3 is to end. If the method 300 is to end, then the process stops at 390; otherwise, the process jumps back to operation 314 where after the operations of 314-320 may be repeated as desired.

Figure 4:
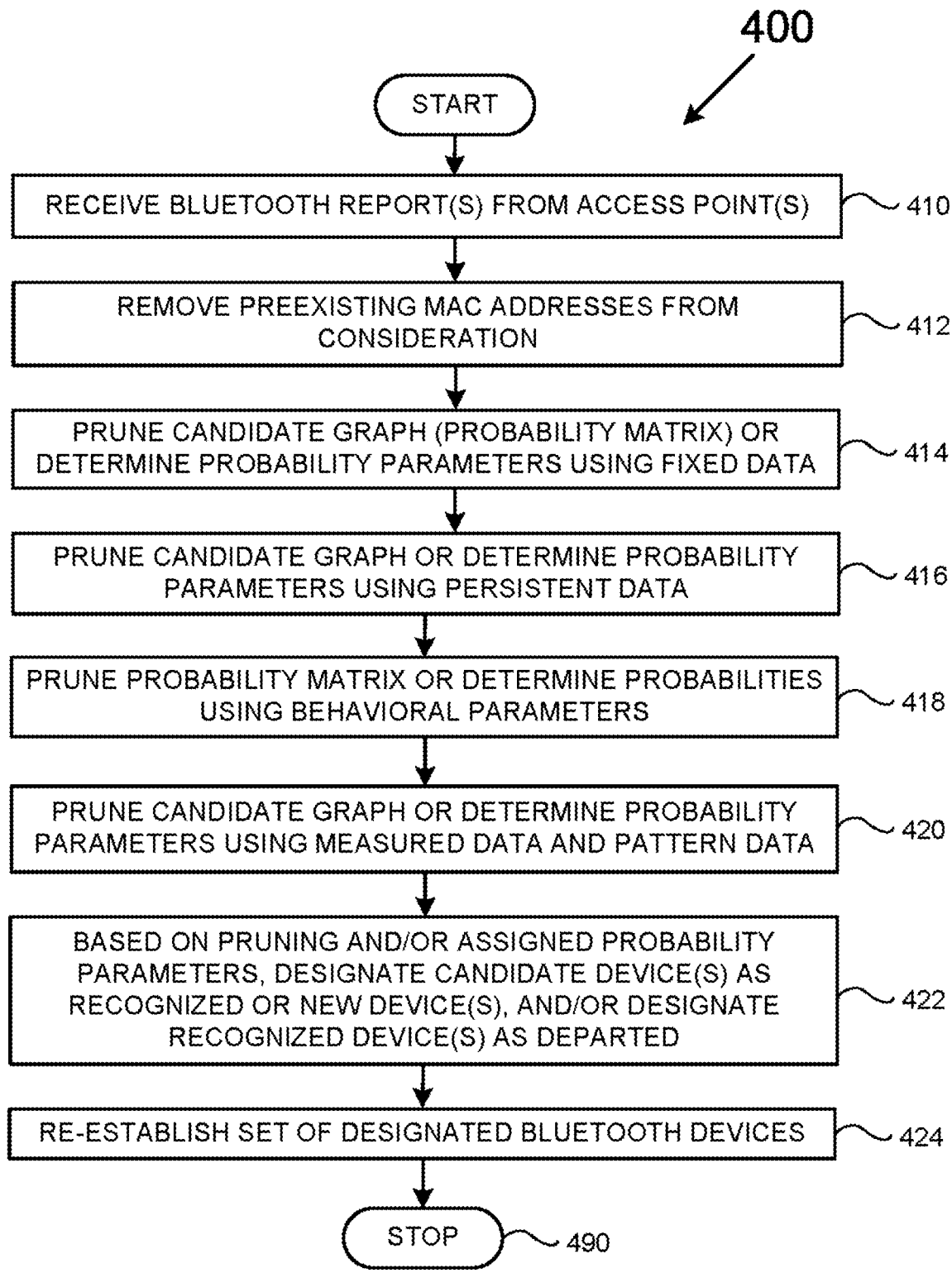
FIG. 4 is a flowchart of a method for resolving the identities of various Bluetooth devices as they change their UIADDs.

FIG. 4 is a flowchart of a method 400 for resolving the identities of various Bluetooth devices as they change their UIADDs. FIG. 4 provides details of operation 316 of FIG. 3 in one or more implementations. As with FIG. 3, it is to be appreciated to those skilled in the art in light of this disclosure that, while the various operations of FIG. 4 are shown according to a particular order for ease of explanation, that certain operations may be performed in different orders or performed in a parallel fashion. By way of example, if all assignments for newly-discovered UIADDs are resolved by operation 414, then operations 416-422 may be omitted, or at least skipped for an iteration. Further, various operations may be combined. For instance, operations 414-418 may be combined. In a similar fashion, operation 420, which relates to different types of weak correlative data, may be accomplished using multiple operations.

The process starts in operation 410 where some form of processing device receives a set of passively-collected data during a particular time period from one or more Bluetooth access points. The passively-collected data of operation 410 includes data collected from one or more AEs and can contain a UIADD and at least one other item of related information for each of one or more Bluetooth devices in the area containing one or more Bluetooth access points. As discussed above, the additional data may include any combination of fixed data, persistent data, behavioral data, measured data and pattern data. With respect to UIADDs observed in operation 410, reference is made to FIG. 8, which as discussed above depicts an AET whereby advertisement packets are passively monitored by a number of Bluetooth access points such that a CG may be established and used according to the following operations.

Operation 412 assumes that some initial/first set of data that includes a UIADD and at least one other item of related information for each of one or more Bluetooth devices located in the area containing one or more Bluetooth access points was previously collected, and that a set of one or more recognized Bluetooth devices was established bed upon the first set of data. In operation 412, those UIADDs from the previously-established set of recognized Bluetooth devices are removed from consideration such that only newly-observed UIADDs are processed.

In operation 414, reference is made to FIGS. 9A-9C, which depicts the pruning of a "Candidates Graph" (CG) 900A. Specifically, in operation 414, the CG (which is a form of probability matrix depicting prospective relationships between candidate Bluetooth devices and recognized Bluetooth devices) is either pruned using heuristic rules based on any fixed data, or in the alternative some form of probability parameter(s) are established using the fixed data in order to eliminate unlikely associations between one or more candidate Bluetooth devices and the recognized Bluetooth devices. By way of example, if the manufacturer identification associated with UIADD MA-1 is different from the manufacturer identification associated with UIADD MA-2P, then the connection between UIADD MA-1 and UIADD MA-2P may be pruned/removed by some form of heuristic rules. In the alternative, some very low probability (e.g., zero) for the connection between UIADD MA-1 and UIADD MA-2P may be assigned.

In operation 416, similar to operation 414, the CG is either pruned using heuristic rules based on any persistent data, or in the alternative some form of probability parameter(s) are established using the persistent data. As discussed above the term "persistent data" refers to any intrinsic quality of a Bluetooth device that is not immutable but is expected to change at most minutely in a predetermined time period, such as a battery level.

In operation 418, the CG is either pruned using heuristic rules based on any behavioral data, or in the alternative some form of probability parameter(s) are established using the behavioral data. As discusses above "behavioral data" may refer to, for example, the particular times and/or frequency that a given Bluetooth device changes its UIADD, the particular times and/or frequency that a given Bluetooth device broadcasts an AE, the frequency that a particular Bluetooth device makes other broadcasts/transmissions or any other possible behavior that might be expected or observed by a Bluetooth device.

In operation 420, the CG is either pruned using heuristic rules based on any combination of measured data and pattern data, or in the alternative some form of probability parameter(s) are established using the measured data and pattern data. It is to be appreciated that, because measured data and pattern data provide substantially weaker associations between candidate Bluetooth devices and recognized Bluetooth devices than fixed data, persistent data and behavioral data, that establishing probability parameter(s) using measured data and pattern data may often provide more accurate results than using heuristic rules.

In operation 422, based on the pruning of the previous operations 414-420 and/or any probability parameters established by previous operations 414-420: (1) associations may be established between previously recognized Bluetooth devices and candidate Bluetooth devices, (2) newly-discovered UIADDs may be associated with new Bluetooth devices, and/or (3) recognized Bluetooth devices may be determined as departed from the area of interest.

In operation 424, based on operation 422, the set of recognized Bluetooth devices is re-established/re-designated taking into considering how the candidate Bluetooth devices are resolved in operation 422.

Figure 5:
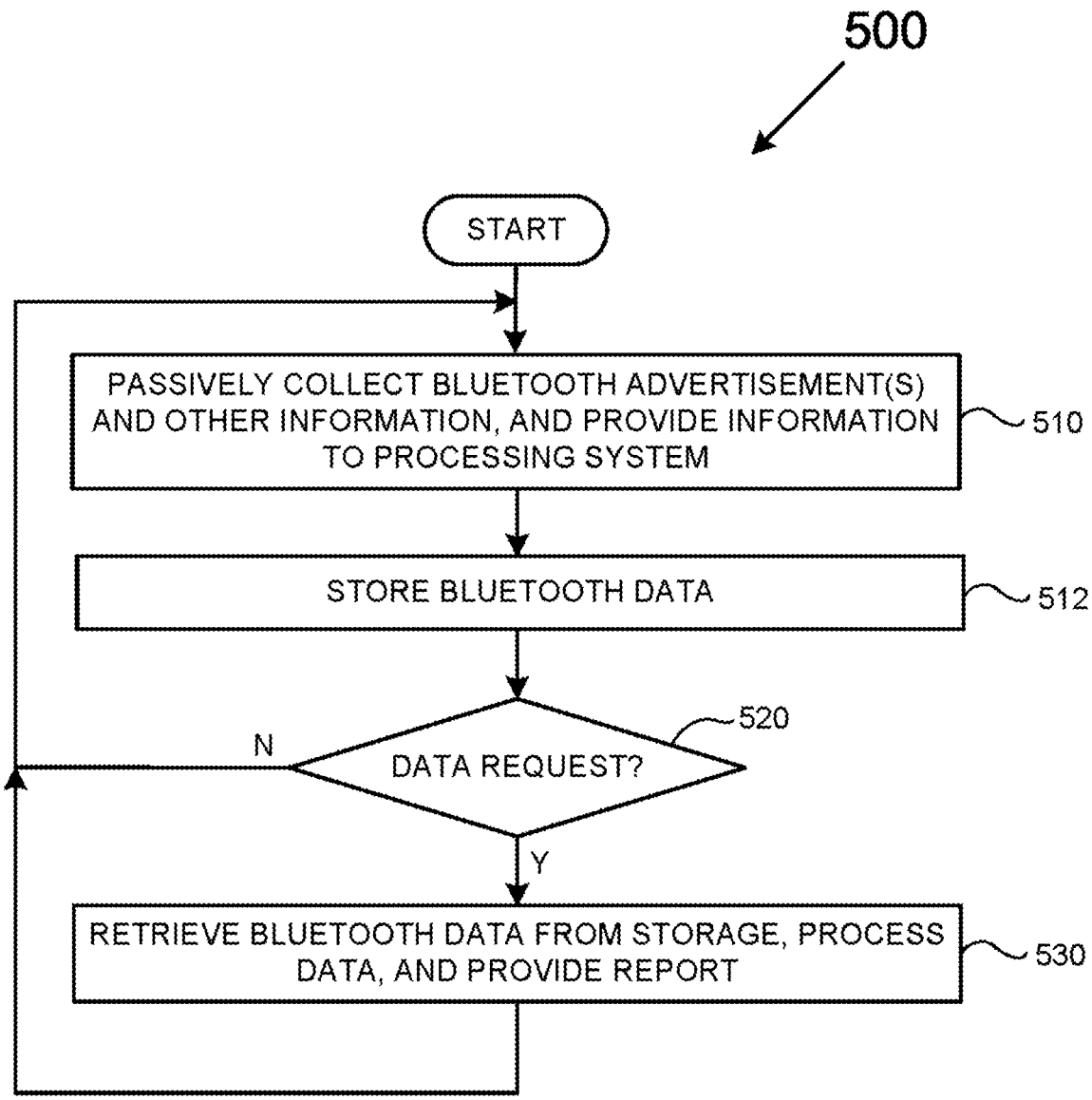
FIG. 5 is a flowchart of a method usable to collect Bluetooth data such that the identities of various Bluetooth devices may be later resolved.

FIG. 5 is a flowchart depicting a method 500 usable to collect Bluetooth data such that the identities of various Bluetooth devices may be later resolved even when such devices change UIADDs. The method 500 of FIG. 5 may be useful when there is no reason to perform Bluetooth device tracking in real time. Accordingly, the method 500 of FIG. 5 is directed to the passive collection and storage of data whereby, at any time, a processing system may request all or a specific portion of the stored data. As with FIGS. 3 and 4, it is to be appreciated to those skilled in the art in light of this disclosure that, while the various operations of FIG. 5 are shown according to a particular order for ease of explanation, that certain operations may be performed in different orders or performed in a parallel fashion.

The process starts in operation 510 where some form of processing system receives a first set of passively-collected data during a first time period from one or more Bluetooth access points. As with FIG. 3, each set of passively-collected data includes a UIADD and at least one other item of related information for each of one or more Bluetooth devices. Again, such data may include any or a combination of fixed data, persistent data, behavioral data, measured data, and pattern data. Next, in operation 512, the received Bluetooth data is stored in some form of data storage, such as a database located in a magnetic hard drive. Then, in operation 520 a determination is made as to whether some form of data request is made. If a data request is made, then the process continues to operation 520; otherwise, the process jumps back to operation 510 where after the operations of 510-520 may be repeated as desired.

In operation 530, the stored data of operation 512 is retrieved from storage, appropriately processed to determine a likely number of unique Bluetooth devices consistent with the methods of FIGS. 3 and 4, and the processed data is then appropriately reported. Afterwards, the process jumps back to operation 510 where after the operations of 510-520 may be repeated until another data request is received.

It is of interest to note that the disclosed systems and methods may be adapted to work in other protocols that implement address randomization with appropriate changes as will be apparent to those skilled in the relevant arts. For example, the disclosed methods and systems may also apply to IEEE 802.11 systems and cellular systems.

In various examples where the above-described systems and/or methods are implemented using a programmable device, such as a computer-based system or programmable logic, it should be appreciated that the above-described systems and methods can be implemented using any of various known or later developed programming or scripting languages, such as "SQL," "C," "C++," "FORTRAN," "Pascal," "Python," "VHDL" and the like.

Accordingly, various storage media, such as magnetic computer disks, optical disks, electronic memories or any other form of non-transient computer-readable storage memory, can be prepared that can contain information and instructions that can direct a device, such as a computer, to implement the above-described systems and/or methods. Such storage devices can be referred to as "computer program products" for practical purposes. Once an appropriate device has access to the information and programs contained on the storage media/computer program product, the storage media can provide the information and programs to the device, thus enabling the device to perform the above-described systems and/or methods. Unless otherwise expressly stated, "storage medium" is not an electromagnetic wave per se.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to database-related services.

While the methods and systems above are described in conjunction with specific examples, it is evident that many alternatives, modifications, and variations will be apparent to those skilled in the art. Accordingly, the examples above as set forth herein are intended to be illustrative, not limiting. There are changes that may be made without departing from the scope of the present disclosure.

What is claimed is:

1. A method for resolving Bluetooth device identity regardless of changes in Unique Identity ADDresses (UIADDs), the method comprising:
    establishing a set of recognized Bluetooth devices based on a first set of data received from one or more Bluetooth access points for a first time period, the first set of data including both a UIADD and related information for each of at least one Bluetooth device;
    receiving a second set of data from the one or more Bluetooth access points, the second set of data including both a UIADD and related information for each of at least one Bluetooth device, the second set of data being measured during a second time period subsequent to the first time period; and
    in an instance in which a particular UIADD from the second set of data is not found in the first set of data, determining whether a candidate Bluetooth device that transmitted the particular UIADD is a specific recognized Bluetooth device of the set of recognized Bluetooth devices based on the related information of the candidate Bluetooth device and the first set of data and is based on both at least one heuristic rule and at least one probability parameter between the candidate Bluetooth device with the specific recognized Bluetooth device.

2. The method of claim 1, wherein the related information of the candidate Bluetooth device includes fixed data.

3. The method of claim 2, wherein the fixed data of the candidate Bluetooth device includes a manufacturer identification.

4. The method of claim 2, wherein the related information of the candidate Bluetooth device further includes persistent data of the candidate Bluetooth device.

5. The method of claim 4, wherein the persistent data of the candidate Bluetooth device includes a battery storage level.

6. The method of claim 2, wherein the related information of the candidate Bluetooth device further includes behavioral data of the candidate Bluetooth device.

7. The method of claim 6, wherein the behavioral data of the candidate Bluetooth device includes at least one of: a time that the candidate Bluetooth device transmits an advertisement event and a time that the particular UIADD first appears.

8. The method of claim 2, wherein the related information associated with the particular UIADD includes a received signal strength indicator.

9. The method of claim 2, wherein the related information of the candidate Bluetooth device includes a data pattern of a signal transmitted by the candidate Bluetooth device.

10. The method of claim 2, wherein the related information data of the specific recognized Bluetooth device includes:
fixed data of the specific recognized Bluetooth device,
persistent data of the specific recognized Bluetooth device,
behavioral data of the specific recognized Bluetooth device,
an estimated distance of the specific recognized Bluetooth device from a Bluetooth access point, the estimated distance being based a Received Signal Strength Indicator (RSSI); and
a data pattern of a signal transmitted by the specific recognized Bluetooth device.

11. The method of claim 1, wherein the operation of determining whether the candidate Bluetooth device is the specific recognized Bluetooth device is based on a probabilistic correlation of the related data of a plurality of recognized Bluetooth devices and the related data of the candidate Bluetooth device.

12. A processing system that resolves Bluetooth device identity regardless of changes in Unique Identity ADDresses (UIADDs), the system comprising:
a processor; and
a memory communicatively coupled to the processor, wherein
based on instructions in the memory, the processor:
establishes a set of recognized Bluetooth devices based on a first set of data received from one or more Bluetooth access points for a first time period, the first set of data including both a UIADD and related information for each of at least one Bluetooth device;
receives a second set of data from the one or more Bluetooth access points, the second set of data including both a UIADD and related information for each of at least one Bluetooth device, the second set of data being measured during a second time period subsequent to the first time period; and
in an instance in which a particular UIADD from the second set of data is not found in the first set of data, determines whether a candidate Bluetooth device that transmitted the particular UIADD is a specific recognized Bluetooth device of the set of recognized Bluetooth devices based on the related information of the candidate Bluetooth device and the first set of data and is based on both at least one heuristic rule and at least one probability parameter between the candidate Bluetooth device with the specific recognized Bluetooth device.

13. The system of claim 12, wherein the recognized information of the candidate Bluetooth device includes:
fixed data of the candidate Bluetooth device.

14. The system of claim 13, wherein the recognized information of the candidate Bluetooth device further includes:
at least one of persistent data of the candidate Bluetooth device and behavioral data of the candidate Bluetooth device.

15. The system of claim 14, wherein:
the fixed data includes a manufacturer identification of the candidate Bluetooth device;
the persistent data includes a battery storage level of the candidate Bluetooth device; and
the behavioral data includes at least one of a time that the candidate Bluetooth device transmits an advertisement event and a time that the particular UIADD first appears.

16. The system of claim 14, wherein the at least one other item of data of the candidate Bluetooth device further includes:
an estimated distance of the candidate Bluetooth device from a Bluetooth access point, the estimated distance being based on a Received Signal Strength Indicator (RSSI).

17. The system of claim 14, wherein the recognized information of the candidate Bluetooth device further includes a data pattern embedded in a signal transmitted by the candidate Bluetooth device.

18. A computer program product for resolving Bluetooth device identity regardless of changes Unique Identity ADDresses (UIADDs), comprising:
a non-transient computer-readable storage memory containing a plurality of instructions such that, when operated upon by a processing system that includes a processor and a memory communicatively coupled to the processor, causes the processor to:
establish a set of recognized Bluetooth devices based on a first set of data received from one or more Bluetooth access points for a first time period, the first set of data including both a UIADD and related information for each of at least one Bluetooth device;
receive a second set of data from the one or more Bluetooth access points, the second set of data including both a UIADD and related information for each of at least one Bluetooth device, the second set of data being measured during a second time period subsequent to the first time period; and
in an instance in which a particular UIADD from the second set of data is not found in the first set of data, determine whether a candidate Bluetooth device that transmitted the particular UIADD is a specific recognized Bluetooth device of the set of recognized Bluetooth devices based on the related information of the candidate Bluetooth device and the first set of data and is based on both at least one heuristic rule and at least one probability parameter between the candidate Bluetooth device with the specific recognized Bluetooth device.

19. The computer program product of claim 18, wherein the related information of the candidate Bluetooth device includes:
fixed data of the device associated with the candidate Bluetooth device, the fixed data being a manufacturer identification, and
at least one of:
persistent data of the candidate Bluetooth device, the persistent data being a battery storage level of the candidate Bluetooth device, and
behavioral data of the candidate Bluetooth device, the behavioral data being at least one of a time that the candidate Bluetooth device transmits an advertisement event and a time that the particular UIADD first appears.

20. The computer program product of claim 18, wherein the operation of determining whether the candidate Bluetooth device is the specific recognized Bluetooth device is based on a probabilistic correlation of the related data of a plurality of recognized Bluetooth devices and the related data of the candidate Bluetooth device.

* * * * *